(12) United States Patent
Barthold et al.

(10) Patent No.: US 10,284,080 B2
(45) Date of Patent: May 7, 2019

(54) COLUMN-SWITCHED MULTI-MODULE DC-TO-DC POWER TRANSFORMATION SYSTEM

(71) Applicants: Electranix Corporation, Winnipeg (CA); Lionel Barthold, Queensbury, NY (US)

(72) Inventors: Lionel O. Barthold, Queensbury, NY (US); Dennis A. Woodford, Winnipeg (CA); Maryam Salimi, Stuttgart (DE)

(73) Assignees: Lionel O. Barthold, Queensbury, NY (US); Electranix Corporation, Winnipeg, Manitoba (CA)

( * ) Notice: Subject to any disclaimer, the term of this patent is extended or adjusted under 35 U.S.C. 154(b) by 0 days.

(21) Appl. No.: 15/893,614

(22) Filed: Feb. 10, 2018

(65) Prior Publication Data

US 2018/0166983 A1    Jun. 14, 2018

Related U.S. Application Data

(63) Continuation of application No. PCT/US2016/046506, filed on Aug. 11, 2016.

(60) Provisional application No. 62/203,693, filed on Aug. 11, 2015.

(51) Int. Cl.
*H02M 3/06* (2006.01)
*H02M 3/158* (2006.01)
*H02M 1/32* (2007.01)

(52) U.S. Cl.
CPC ............ *H02M 3/06* (2013.01); *H02M 3/1582* (2013.01); *H02M 3/1584* (2013.01); *H02M 1/32* (2013.01); *H02M 2003/1586* (2013.01); *Y02B 70/1425* (2013.01)

(58) Field of Classification Search
CPC .......... H02M 3/06; H02M 3/02; H02M 3/145; H02M 3/155; H02J 1/00; H02J 7/34; H02J 7/345
See application file for complete search history.

(56) References Cited

U.S. PATENT DOCUMENTS

| 6,118,678 A * | 9/2000 | Limpaecher | ........ H02M 5/4505 307/109 |
| 2008/0013351 A1 * | 1/2008 | Alexander | ........ H02M 3/1582 363/123 |

(Continued)

FOREIGN PATENT DOCUMENTS

WO    2015/156854 A1    10/2015

OTHER PUBLICATIONS

The International Preliminary Report on Patentability dated Feb. 22, 2018 for PCT Application No. PCT/US2016/046506.

*Primary Examiner* — Gary L Laxton
(74) *Attorney, Agent, or Firm* — Brian M. Dingman; Dingman IP Law, PC

(57) ABSTRACT

A transformation system capable of efficiently transforming electrical power from one dc voltage to one or more other dc voltages or of regulating power flow within a network of constant nominal voltage; in each case without intermediate magnetic transformation. The transformation system is based on periodic and resonant delivery of charge from the first of two dc nodes to a system of capacitors, electrical reconfiguration of those capacitors, then delivery of power to one or more other dc nodes.

30 Claims, 17 Drawing Sheets

(56) References Cited

U.S. PATENT DOCUMENTS

| | | | | |
|---|---|---|---|---|
| 2013/0119970 A1* | 5/2013 | Trainer | ................... | H02M 3/07 323/364 |
| 2015/0192973 A1* | 7/2015 | Hintz | ................... | B60L 11/005 307/80 |
| 2015/0364918 A1* | 12/2015 | Singh | ................... | G05F 1/67 307/78 |

\* cited by examiner

Input & Output
Current Waveform

| Step | Column A | Column B | Column C | Column d |
|---|---|---|---|---|
| | | Connected to: | | |
| 1 | Node A | Node B | Node C | Node D |
| 2 | Node B | Node C | Node D | Node A |
| 3 | Node C | Node D | Node A | Node B |
| 4 | Node D | Node A | Node B | Node C |
| . | | | | |
| . | | *Repeating* | | |
| . | | ⬇ | | |
| . | | | | |
| . | | | | |
| . | | | | |
| . | | | | |

Figure 17

COLUMN-SWITCHED MULTI-MODULE DC-TO-DC POWER TRANSFORMATION SYSTEM

CROSS-REFERENCE TO RELATED APPLICATION

This application is a continuation of and claims priority of PCT/US16/46506, filed on Aug. 11, 2016, which itself claimed priority of Provisional Application 62/203,693, filed on Aug. 11, 2015.

FIELD

This innovation pertains to conversion of electric power from one dc voltage to one or more other dc voltages without the use of magnetically-based transformers.

BACKGROUND

Technologies used in conversion between alternating current (ac) and direct current (dc) have advanced rapidly over the past decades, as has the use of dc as a means of transporting large amounts of power. Dc transports power more efficiently than ac and unlike ac, is able to do so at a controlled level, e.g. at a level corresponding to the maximum thermal capability of the conductors used.

The number of high voltage dc transmission projects has grown in distance, voltage level and power rating. Furthermore the need for dc-to-dc transformation has been limited since, irrespective of the dc transmission voltage, ac transformers are included in both sending and receiving terminals so that conversion to a voltage convenient to the local system is quite straight forward. However ongoing evolution of the world's electric supply system gives rise to at least four general applications where direct dc-to-dc transformation can have an important role.

1. Both in Europe and North America, system planners foresee the need for an extensive, very high voltage dc network to serve as an overlay to the existing ac transmission system. However in addition to the connection of such a grid to key points in that ac system, an economic dc-to-dc transformer will allow both interconnection of that grid to a number of major existing dc transmission lines and transformation of different dc voltages among dc lines comprising a dc grid, thereby providing major additional economic benefits to consumers of electricity.
2. In context of a dc grid the ac-to-dc converters that connect ac systems to the dc grid will have limited control of power through the various dc transmission lines comprising the grid. Dc-to-dc transformers placed strategically in the dc grid will provide a desired dc power flow through the transmission lines of the dc grid where it is not possible to accomplish with the ac-to-dc converters
3. The electrical architecture of wind farms is relatively complex and, in some systems, makes use of ac-to-dc conversion at the wind turbine site to accommodate the asynchronous nature of the ac voltage generated by variable speed blades. Rather than reconvert that dc to synchronous ac, as is now the practice, direct transformation of that dc energy to a high dc level for aggregation within a wind farm, and to a yet higher dc voltage for transmission to a load center, could affect major cost reductions in the aggregation of power at a central point on the wind farm as well as transmission of the collected power to a convenient point on the ac receiving system.
4. Household, commercial, and industrial loads are increasingly either dependent on dc or, in some cases, could operate more efficiently if converted to dc. Charging load for electric automobiles, projected to grow very rapidly as a percentage of total electrical load, is a prime example. This realization has steadily increased the interest in dc distribution systems whereby dc loads, rather than depending on either small scale plug-in or internal ac-to-dc converters, could be served directly from existing distributions poles or cable routes.

DESCRIPTION OF PRIOR ART

Dc-to-dc conversion at very lower voltage (electronic) levels, e.g. within power supplies for computers, telephones, and other electronic devices, is well established. However this technology has been developed with vastly different needs and different constraints than those characterizing high voltage power-level applications as addressed in the present disclosure. For example insulation requirements at the millivolt level are a secondary issue, while at high dc voltage it is paramount. Available switching devices differ as well, as do constraints on practical capacitor-to-capacitor and capacitor-to-node switching methods. At electronic levels heat generation is a greater limit to losses than efficiency whereas the reverse is true in high voltage power applications. Furthermore, since inclusion of reactors within circuit boards is impractical, transfer of charge from one capacitor to another or between two capacitors must be done directly, thus resulting in higher losses. Thus opportunities for direct adaptation of electronic technology to higher voltage dc applications are limited.

Where conversion between two high dc voltages is needed, as is the case in some industrial applications, dc is first converted to a convenient ac level, often at a high ac frequency to reduce the cost of a transformer used to change to another ac voltage and thence, through an ac-to-dc then transformed by a conventional inductive transformer to a different ac voltage, and finally transformed from ac to the desired dc secondary voltage. A related development is to replace the conventional inductive transformer with a circuit of inductors and capacitors to achieve resonant voltage amplification. While effective technically, triple transformation schemes of this type are expensive and relatively inefficient. One double transformation scheme requires no ac transformer between the two converters resulting in limited range in dc voltage ratio. The trend for dc-to-dc voltage conversion is with various configurations of switched capacitor configurations. These store energy from one dc side then switch to the other dc side to release the stored energy.

SUMMARY

The foregoing illustrates the need for an efficient and economical dc-to-dc transformer (DCT) capable of both upward and downward transformation of voltage and, where necessary, operating at the highest existing dc voltage levels at ratings in the thousands of megawatts. To match the functionality of ac transformers through which power transfer is proportional to phase angle difference between primary and secondary systems, a DCT should respond, without a power controller, to the difference in voltage between primary and secondary systems. The systems and methods for capacitive energy transformation described herein are novel and capable of fulfilling that requirement with efficiencies comparable to existing ac-to-ac magnetic and switched capacitor transformations.

Resonant switching, i.e. the connection between capacitors and a dc voltage node through a reactor such that energy interchange is oscillatory and can be interrupted at the first current zero, is used in this disclosure. It will, for example, find application in various situations analogous to the function served by magnetically-based transformers in ac systems, e.g. regulating power flow between two or more dc systems or among multiple lines comprising a high voltage dc grid as well as transforming modest levels of power from a very high dc voltage at which dc-to-ac conversion is uneconomic to a lower dc voltage level where conversion to ac is less costly. It will find applications at lower voltage levels common to distribution and consumption of electric power as well, where dc renewable generation sources are commonly dc as is an increasing fraction of electrical load. It will also find application in transformation of variable frequency sources such as wind generators to a high dc voltage, resulting in more economic connection of individual wind generators to a common point and connection of their aggregation to a convenient point on the receiving ac grid, as well as conversion of ac to dc for distribution, as dc, to homes, business and industry. Other applications of the subject systems and methods will be apparent to those skilled in the art and are within the scope of this disclosure.

While it will be convenient to explain operation of the embodiments described herein in terms of "resonant" half sine-wave pulses of current, interrupted at current zero, it will be recognized by those versed in the art that in a realistic application system parameters may cause the actual wave form, while remaining unipolar, to become irregular and, further, that such irregularities will not affect the operational validity of the examples described herein. It will also be apparent to those versed in the art that the embodiments shown as transforming power between two dc nodes can equally well be applied to transformation of power between a dc node and an electrical load. In the latter case the discharge wave-form would more likely be an exponential decay than a sinusoidal diminution of the pre-discharge capacitive voltage.

This disclosure features a multi-module dc-to-dc power transformation system that is constructed and arranged to transform power from a first higher dc voltage node to a separate second lower dc voltage node, recognizing that either or both voltages may extend to the range of hundreds of kilovolts. The system includes a column comprising a plurality of half-bridge modules or full-bridge modules connected in series, each module comprising a capacitance capable of being either electrically inserted into the series column or electrically isolated and electrically bypassed, its polarity reversed when required. A first end of the column is electrically connected to ground, in which ground is defined as being either an actual ground, or to a metallic return conductor, or to the same end of another DCT connected to a pole of opposite polarity in a dc system with no immediate ground. Connection to ground can be either permanent or by means of a switch. The system further includes two switches, each in series with a reactor; one switch adapted to electrically connect a second end of the column to the first dc voltage node and the other switch adapted to electrically connect the second end of the column to the second dc voltage node. The system also includes a controller adapted to control the states of the switches within the column, and the switches between the column and two dc voltage nodes, so as to transform power by resonant exchange of energy between multiple capacitances within the column and the two nodes.

A half-cycle of resonant and sinusoidally varying current, initiated by the connection of multiple capacitances of the column to a dc voltage node and interrupted at its first current-zero point, may be used by the controller as a means to achieve exchange of energy between those multiple capacitances and the two dc voltage nodes. A ratio of input and output voltage can be established by causing the controller to affect switch positions which electrically bypass selected capacitances of the column between acceptance of charge from the first dc node and delivery of charge to the second dc node.

Stable operation may be achieved by equalizing the charge on a group of capacitances, by, for example (a) using the controller to selectively reassign by-pass states among multiple capacitances during the connection to a lower voltage node—hereinafter cited as the selective bypass embodiment, (b) using the controller to bypass different capacitances from one charge-discharge cycle to the next or (c) causing the controller to bypass all but a whole fraction of the total number of capacitors, then allowing each such fraction to exchange charge resonantly sequentially with the lower voltage node—hereinafter cited as the sequential charge exchange embodiment.

The system may have multiple columns connected in parallel between ground and the two dc nodes, with separate switches in series with a reactor between the second end of each column and each of the two nodes, and wherein the controller is adapted to control the states of all of the switches. The controller may be further adapted to establish input and output current pulses to or from multiple columns that are additive. The controller may be further adapted to cause the generation of pulses from each of the columns and that are equally spaced in time from each other.

A half-cycle of resonant and sinusoidally varying current, initiated by the connection of multiple capacitances of the column to a dc voltage node and interrupted at its first current-zero point, may be used by the controller as a means to achieve exchange of energy between those multiple capacitances and the two dc voltage nodes. A ratio of input and output voltage can be established by causing the controller to affect switch positions which electrically bypass selected capacitances of the column between acceptance of charge from the first dc node and delivery of charge to the second dc node.

Stable operation may be achieved by equalizing the charge on a group of capacitances, by, for example (a) using the controller to selectively reassign by-pass states among multiple capacitances during the connection to a lower voltage node—hereinafter cited as the selective bypass embodiment, (b) using the controller to bypass different capacitances from one charge-discharge cycle to the next or (c) causing the controller to bypass all but a whole fraction of the total number of capacitors, then allowing each such fraction to exchange charge resonantly sequentially with the lower voltage node—hereinafter cited as the sequential charge exchange embodiment.

Also featured herein is a system for power transfer regulation from a first node at one dc voltage to a second node at nominally the same dc voltage. The system includes a plurality of capacitances and a controller that is adapted to use the capacitances so as to resonantly exchange energy between the capacitances and the two nodes.

A half-cycle of resonant and sinusoidally varying current, initiated by the connection of multiple capacitances of the column to a dc voltage node and interrupted at its first current-zero point, may be used by the controller as a means to achieve exchange of energy between those multiple capacitances and the two dc voltage nodes. A ratio of input and output voltage can be established by causing the controller to affect switch positions which electrically bypass selected capacitances of the column between acceptance of charge from the first dc node and delivery of charge to the second dc node.

Stable operation may be achieved by equalizing the charge on a group of capacitances 93 by, for example (a) using the controller to selectively reassign by-pass states among multiple capacitances during the connection to a lower voltage node (hereinafter cited as the selective bypass embodiment), or (b) using the controller to bypass different capacitances from one charge-discharge cycle to the next.

The controller may be further adapted to establish additive input and output current pulses to or from multiple columns. The controller may be further adapted to cause the generation of pulses and/or contiguous pulse groups that are equally spaced in time from each other.

A half-cycle of resonant and sinusoidally varying current, initiated by the connection of multiple capacitances of the column to a dc voltage node and interrupted at its first current-zero point, may be used by the controller as a means to achieve exchange of energy between those multiple capacitances and the two dc voltage nodes. A ratio of input and output voltage can be established by causing the controller to affect switch positions which electrically bypass selected capacitances of the column between acceptance of charge from the first dc node and delivery of charge to the second dc node.

Stable operation may be achieved by equalizing the charge on a group of capacitances, such charge equalization accomplished by using the controller to selectively reassign by-pass states among multiple capacitances during the connection to a lower voltage node. Stable operation may also be achieved by using the controller to bypass different capacitances from one charge-discharge cycle to the next and/or, using a bypassing strategy to allow a whole fraction of the total number of capacitors to exchange charge separately and sequentially with the lower voltage node.

In one aspect a dc-to-dc power transformation system that is constructed and arranged to transform power from a first dc voltage node to a separate second dc voltage node includes at least one column, each column comprising a plurality of capacitive modules connected in series, each capacitive module comprising a series connected capacitance, where each module is constructed and arranged so as to be capable of electrically inserting its capacitance into the column, or electrically isolating and electrically bypassing its capacitance from the column, wherein a first end of the column is electrically connected to ground, first and second reactors, first and second switches, wherein the first switch is in series with the first reactor between a second end of the column and the first node, and the second switch is in series with the second reactor between the second end of the column and the second node, and a controller that is adapted to control the insertion of the capacitances into the column, the isolation and bypassing of the capacitances from the column, and the states of the first and second switches. Through such control the controller repeatedly, sequentially connects the second end of the column to only one of the first and second dc voltage nodes at a time and controls the number of capacitances that are isolated and bypassed from the column before its connection to either dc voltage node during such repeated, sequential connection.

Embodiments may include one of the following features, or any combination thereof. The controller may be adapted to control the states of the first and second switches so as to connect the column to the first dc voltage node so as to initiate a resonant energy exchange between the column and the first dc voltage node, and then disconnect the column from the first dc voltage node at a current zero point following a half-cycle of resonant and sinusoidally varying current, to exchange energy between multiple capacitances of the column and the first dc voltage node. The controller may be adapted to electrically bypass selected capacitances of the column between exchange of charge with the first dc voltage node and exchange of charge with the second dc voltage node, so as to establish a ratio of input and output voltage. One node may be at a higher voltage than the other node, and the controller may be adapted to cause a plurality of series-connected capacitances to exchange charge with the higher voltage node, then, in subsequent connection to the lower voltage node, by electrically bypassing capacitances, serially, separately and sequentially equally distribute the change in charge among the capacitances such that a plurality of capacitances have equal charges. One node may be at a lower voltage than the other node, and a charge exchange cycle may include the sequential connection of the second end of the column to the first node then the second node, and the controller may be adapted to selectively reassign by-pass states among multiple capacitances from one charge exchange cycle to the next during a connection to and charge exchange with the lower voltage dc voltage node, so as to equalize, over a period of multiple charge exchange cycles, charges on multiple capacitances. The system may also include a ground switch that is controlled by the controller so as to provide for transformation between grounded and ungrounded dc systems.

Embodiments may include one of the following features, or any combination thereof. Each module may include a full bridge, such that the capacitances are able to reverse polarity connection in the column. The controller may be adapted to reverse the polarity connection of each module between exchange of charge with the first dc voltage node and exchange of charge with the second dc voltage node. The system may include a number of columns equal to the number of nodes, wherein the system is constructed and arranged to transform power among two or more dc voltage nodes, and wherein the controller is adapted to cause each of the columns to sequentially exchange energy with each node.

Embodiments may include one of the following features, or any combination thereof. The system may include a plurality of columns connected in parallel between ground and the first and second dc voltage nodes, as well as separate switches in series with a reactor between the second end of each column and each of the two nodes, and the controller may be able to control the states of all of the switches. The controller may be further adapted to establish additive input and output current pulses to or from multiple columns. The controller may be further adapted to cause the generation of pulses from each of the columns, where the pulses are equally spaced in time from each other.

Embodiments may include one of the following features, or any combination thereof. For each column the controller may be adapted to control the states of the first and second switches so as to connect the column to the first dc voltage node so as to initiate a resonant energy exchange between the column and the first dc voltage node, and then disconnect the column from the first dc voltage node at a current zero point following a half-cycle of resonant and sinusoidally varying current, to exchange energy between multiple capacitances of the column and the first dc voltage node. For each column the controller may be adapted to electrically bypass selected capacitances of the column between exchange of charge with the first dc voltage node and exchange of charge with the second dc voltage node, so as to establish a ratio of input and output voltage.

Embodiments may include one of the following features, or any combination thereof. One node may be at a higher voltage than the other node, and for each column the controller may be adapted to cause a plurality of series-connected capacitances to exchange charge with the higher voltage node, then, in subsequent connection to the lower voltage node, by electrically bypassing capacitances, serially, separately and sequentially equally distribute the change in charge among the capacitances such that a plurality of capacitances have equal charges. One node may be at a lower voltage than the other node, wherein for each column a charge exchange cycle comprises the sequential connection of the second end of the column to the first node then the second node, and wherein the controller is adapted to selectively reassign by-pass states among multiple capacitances from one charge exchange cycle to the next during a connection to and charge exchange with the lower voltage dc voltage node, so as to equalize, over a period of multiple charge exchange cycles, charges on multiple capacitances. The system may also include a ground switch associated with each column that is controlled by the controller so as to provide for transformation between grounded and ungrounded dc systems. Each module of at least one column may include a full bridge, such that the capacitances are able to reverse polarity connection in the column, and wherein the controller is adapted to reverse the polarity connection of each module between exchange of charge with the first dc voltage node and exchange of charge with the second dc voltage node.

In another aspect a system for power transfer regulation from a first node at one dc voltage to a second node at nominally the same dc voltage, includes a plurality of capacitances and a controller that is adapted to use the capacitances so as to resonantly exchange energy between the capacitances and the two nodes. The controller may be adapted to connect capacitances to the first dc voltage node so as to initiate a resonant energy exchange between the capacitances and the first dc voltage node, and then disconnect the capacitances from the first dc voltage node at a current zero point following a half-cycle of resonant and sinusoidally varying current, to exchange energy between the capacitances and the first dc voltage node. The controller may be adapted to electrically bypass selected capacitances between exchange of charge with the first dc voltage node and exchange of charge with the second dc voltage node, so as to establish a ratio of input and output voltage. One node may be at a lower voltage than the other node, and a charge exchange cycle may comprise the sequential connection of the capacitances to the first node then the second node, and the controller may be adapted to selectively reassign by-pass states among multiple capacitances from one charge exchange cycle to the next during a connection to and charge exchange with the lower voltage dc voltage node, so as to equalize, over a period of multiple charge exchange cycles, charges on multiple capacitances. The system may also include a ground switch that is controlled by the controller so as to provide for transformation between grounded and ungrounded dc systems. The controller may be adapted to reverse the polarity connection of each capacitance between exchange of charge with the first dc voltage node and exchange of charge with the second dc voltage node.

Embodiments may include one of the following features, or any combination thereof. The controller may be further adapted to establish input and output current pulses from multiple columns that are additive. The controller may be further adapted to cause the generation of pulses that are equally spaced in time from each other. The controller may be adapted to electrically bypass selected capacitances of the column between exchange of charge with the first dc voltage node and exchange of charge with the second dc voltage node, so as to establish a ratio of input and output voltage. One node may be at a lower voltage than the other node, wherein a charge exchange cycle comprises the sequential connection of the capacitances to the first node then the second node, and wherein the controller is adapted to selectively reassign by-pass states among multiple capacitances from one charge exchange cycle to the next during a connection to and charge exchange with the lower voltage dc voltage node, so as to equalize, over a period of multiple charge exchange cycles, charges on multiple capacitances. The controller may be adapted to reverse the polarity connection of each capacitance between exchange of charge with the first dc voltage node and exchange of charge with the second dc voltage node.

In another aspect a method of transforming power from a first dc voltage node to one or more separate second dc voltage nodes using at least one column, each column comprising a plurality of capacitive modules connected in series, each capacitive module comprising a series connected capacitance, where each module is constructed and arranged so as to be capable of electrically inserting its capacitance into the column, or electrically isolating and electrically bypassing its capacitance from the column, wherein a first end of the column is electrically connected to ground or a node of opposite polarity, and a second end of the column is selectively electrically coupled to the first and second nodes includes repeatedly, sequentially connecting the second end of the column to only one of the first and second dc voltage nodes at a time and controlling the number of capacitances that are isolated and bypassed from the column before its connection to either dc voltage node during such repeated, sequential connection. There may be a plurality of columns connected in parallel between ground and the first and second dc voltage nodes and separate switches in series with a reactor between the second end of each column and each of the two nodes, and the method may include controlling the states of all of the switches such that galvanic connection of the nodes is prevented.

BRIEF DESCRIPTION OF THE DRAWINGS

Other objects, features and advantages will occur to those skilled in the art from the following description of the preferred embodiments of the innovations and the accompanying drawings.

FIG. 17 shows an example switching sequence capable of achieving four-way transformation within the dc-to-dc transformer embodiment of FIG. 16.

EMBODIMENTS

To simplify explanation of the embodiments cited herein, commonly used power electronic switching devices such as thyristors, insulated gate bipolar transistors (IGBTs) and diodes, are all represented herein by a simple switch symbol, their function being clear from the context of the figures presented. Furthermore the more general identification of "nodes" will, in higher voltage power applications correspond to "busses." Also to simplify explanation the same numbers are sometimes used in multiple drawings to refer to the same element, and such elements are not necessarily discussed in conjunction with each drawing in which they are present.

Embodiments cited herein are based on electrical charge transfers between two dc voltage busses by means of intermediate transfer to multiple capacitors. Losses in transfers of that kind can be minimized by affecting the transfer resonantly, i.e. by placing an inductance in series with the switch effecting the transfer, thus causing a resonant sinusoidal wave of current which can be interrupted at current zero by power electronic switching devices, e.g. thyrsitors or solid state bidirectional switches, leaving the capacitor(s) involved with either an increase or decrease in charge and a corresponding higher or lower voltage. The principles of such resonant transfers are well known to those versed in the art.

Figure 1:
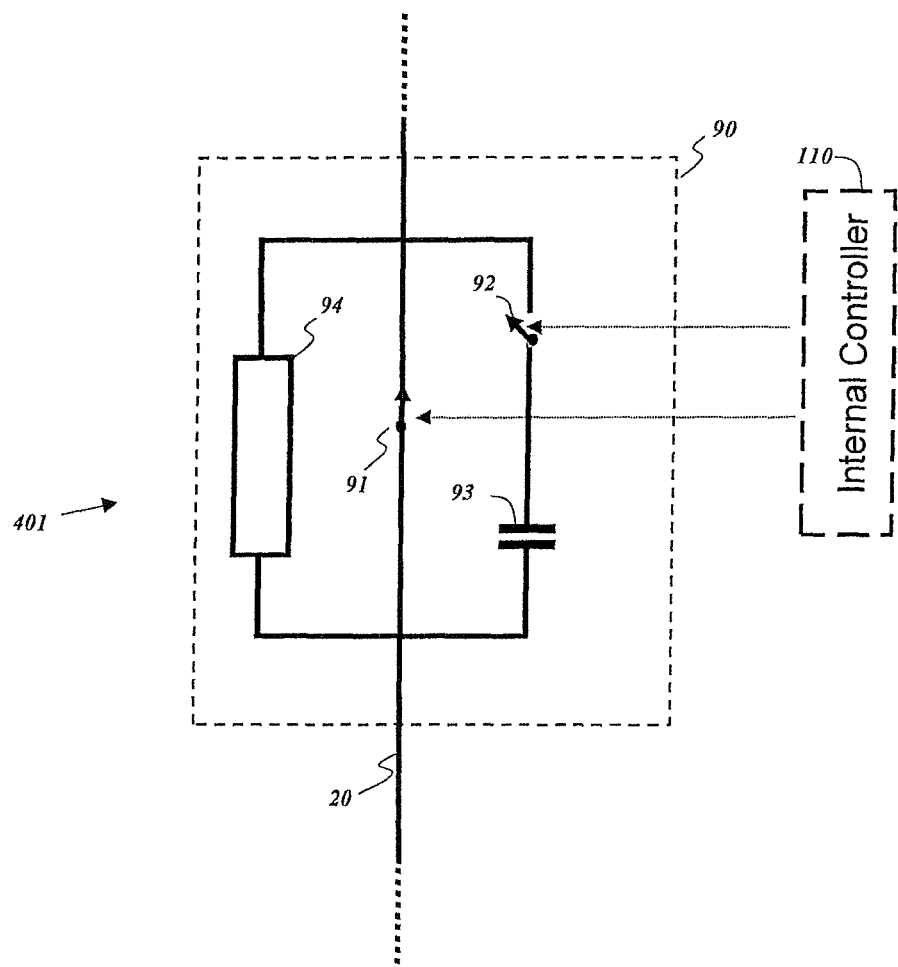
FIG. 1 shows a prior art half-bridge module with internal switches configured to disconnect and bypass the internal capacitor.

Capacitor(s) 93 that can be used in the present system is embedded in a prior-art half-bridge module 90 as illustrated in FIG. 1; half bridge modules per se are well known in the art. The term "half-bridge" as used in this disclosure refers either to (1) a composite capacitor and switch module 90 as shown in FIG. 1 which is capable of either electrically inserting a capacitance into a series circuit or isolating that capacitance and bypassing it within the same series circuit or (2) any other configuration of switches and capacitances which collectively function as the half-bridge described above. Note that the capacitance 93 is illustrated as a single capacitor but the capacitance could also be accomplished with a series of electrically coupled capacitors or other devices that exhibit capacitance.

System 401, FIG. 1, also has a controller 110. A controller 110 can be used to regulate the sequence and timing of all switches in the various embodiments described herein; this controller is present in each example but is not shown in every drawing. In some drawings this control is indicated by lines between the controller and the switches. The controller can be part of a custom circuit that includes the half bridges or it can be a separate controller that is operably coupled to the switches. FIG. 1 also shows a commonly applied protective device 94 to protect elements within the half-bridge in the event of an electrical fault in the system within which it is applied. Such modules 90 may consist either of independently arrayed switches 91, 92 and capacitor 93 or commercially available and commonly applied half-bridge modules 90 consisting of the same components 91, 92, 93. Commercially available modules are equipped with capacitors 93 of relatively higher microfarad rating.

Figure 2:
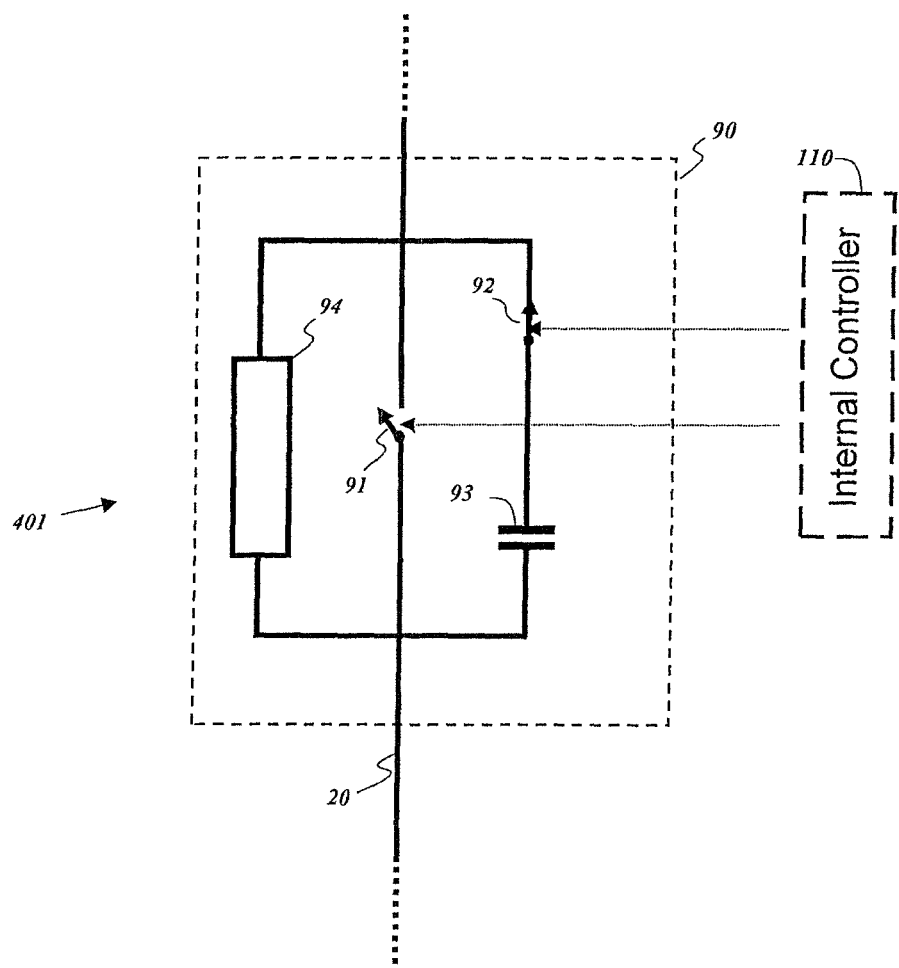
FIG. 2 shows the half-bridge module of FIG. 1 with its internal switches configured to insert the internal capacitor into the circuit to which it is connected.

Capacitor 93 may be either inserted into circuit 20 by opening of switch 91 and closing switch 92, or removed from circuit 20 and bypassed by opening switch 92 and closing switch 91. Changing from one state to another within such a module 90 can be achieved in the order of microseconds; orders of magnitude shorter than a reasonable period of resonant charge exchange between capacitors 93. Whereas FIG. 1 shows the capacitor 93 within the half-bridge disconnected from the series circuit of which it is a part by the closing of switch 91 and opening of switch 92, FIG. 2 shows the same capacitor 93 inserted into the series circuit by opening of switch 91 and closing of switch 92.

Figure 3:
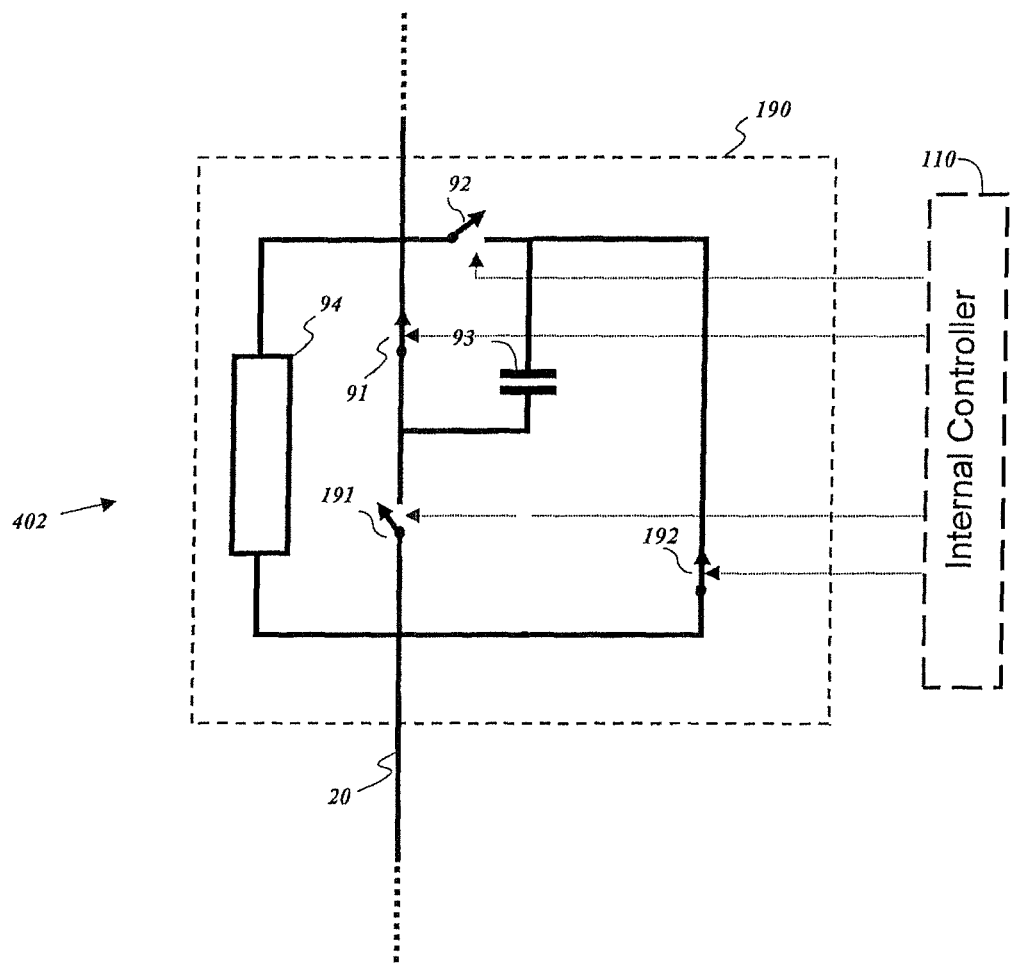
FIG. 3 shows a prior art full-bridge module with internal switches configured to reverse the connection of a capacitor between removal and restoration of that capacitor from an external circuit.

It will be shown necessary in certain embodiments of this invention to reverse the polarity of capacitors by inverting their connection to the external circuit between one step in DCT operation and another. FIG. 3 shows system 402 with one configuration of a prior art "full-bridge" 190 capable of the functions cited for the half bridge of FIGS. 1 and 2, but also inverting the connection of a capacitor 93 between the time of its isolation and the time of its reconnection by opening switch 191 and 92, and closing switch 91 and 192. The term "full-bridge" as used in this disclosure refers either to (1) a composite capacitor and switch module such as shown as 190 in FIG. 3 which is capable of being either electrically inserted into the column or electrically isolated and electrically bypassed and polarity reversed when required and is commonly identified with the name "full-bridge," or (2) any other configuration of switches and capacitances which collectively function as the full-bridge described above. Note that the capacitance 93 is illustrated as a single capacitor but the capacitance could also be accomplished with a series of electrically coupled capacitors or other devices that exhibit capacitance.

Figure 4:
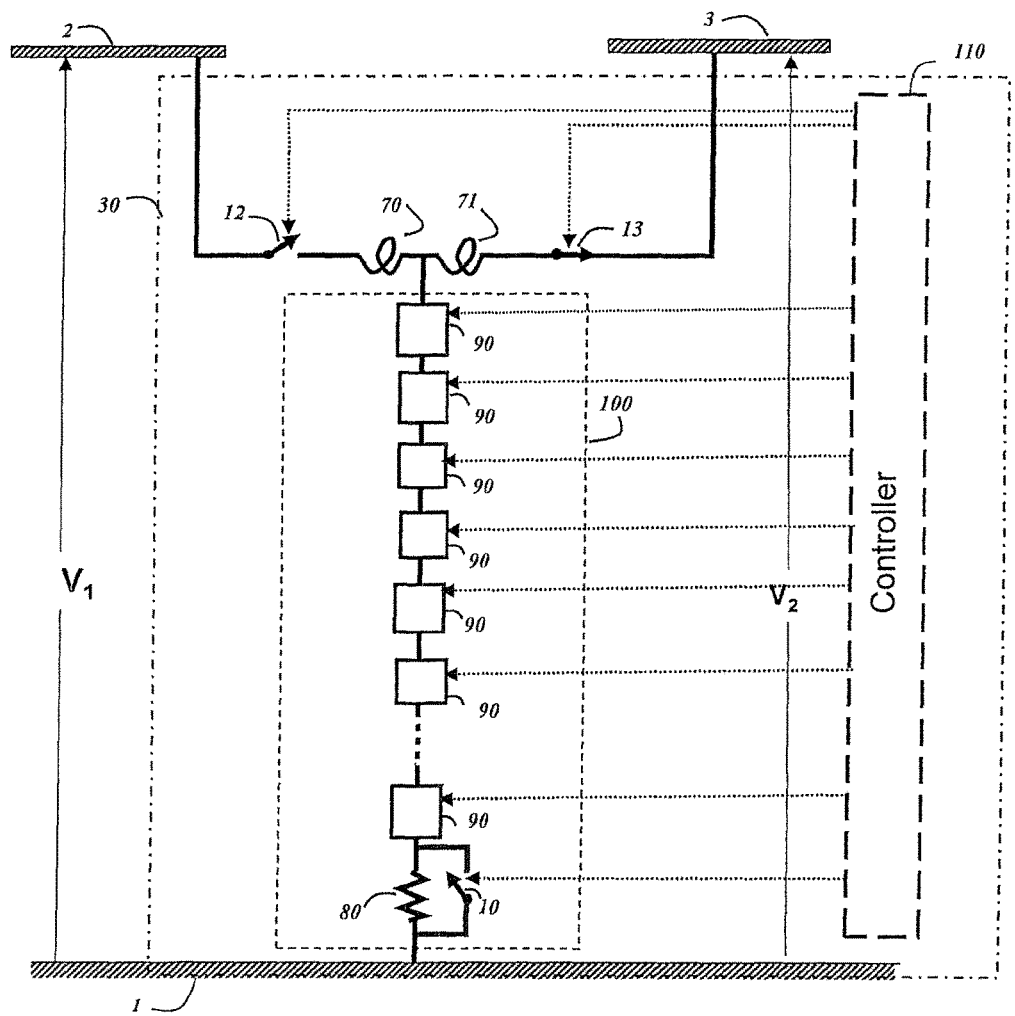
FIG. 4 shows a multi-modular dc-to-dc power transformation system embodiment configured for initial pre-operational charging of capacitors within half-bridge modules.

FIG. 4 illustrates a basic embodiment of a multi-module dc-to-dc power transformation system (MMDCT) 30 disclosed herein which uses a column 100 comprised of multiple half-bridge modules 90 connected in series. Column 100 can be alternately connected either to a first dc node 2 through reactor 70 and switch 12 or a second, dc node 3 through a second reactor 71 and second switch 13, by controller 110 controlling the states of switches 12 and 13. In practice, these switches 12 and 13 and their counterparts in subsequent drawings are complementary, i.e. when one switch is closed the other will always be open, thus always providing galvanic isolation between the two nodes 2 and 3. Reactors 70 or 71 may be made to vary in value when the dc voltage transformer ratio is made adjustable.

The embodiment shown in FIG. 4 will operate either as a step-up or a step-down transformer of energy and in either a selective bypass or sequential charge exchange embodiments. The selective bypass embodiment operates with two repetitive steps which comprise an operating cycle. Consider first operation as a step-up DCT:

Start-Up

Assume there are a total of n half-bridge modules 90 within the column of capacitive modules 100, each containing a capacitor 93 which can, as illustrated in FIG. 1, be electrically inserted into that column 100 or bypassed and electrically removed from that column 100. Assume further, that the $V_2 > V_1$ so that the DCT illustrated in FIG. 4 is intended to convert energy at a nominal voltage $V_1$ up to energy at a higher nominal voltage $V_2$. During initial start-up energization, switch 12 is open and switch 13 is caused to close as shown in FIG. 4, thus providing an initial charging path for the column of capacitive modules 100 from the second higher voltage node 3 to ground 1. During this initial charging, switch 10 is opened, inserting resistor 80 into the initial charging path, thereby avoiding resonant overshoot and leaving each of the n capacitors 93 within the column of modules 100 with a charge of $V_2/n$. Switch 13 is then opened and switch 10 permanently closed for normal operation. Ground is defined as being either an actual ground, or to a metallic return conductor, or to the same end of another DCT connected to a pole of opposite polarity in a dc system with no immediate ground. Connection to ground can be either permanently or by means of a switch.

Step 1

Figure 5:
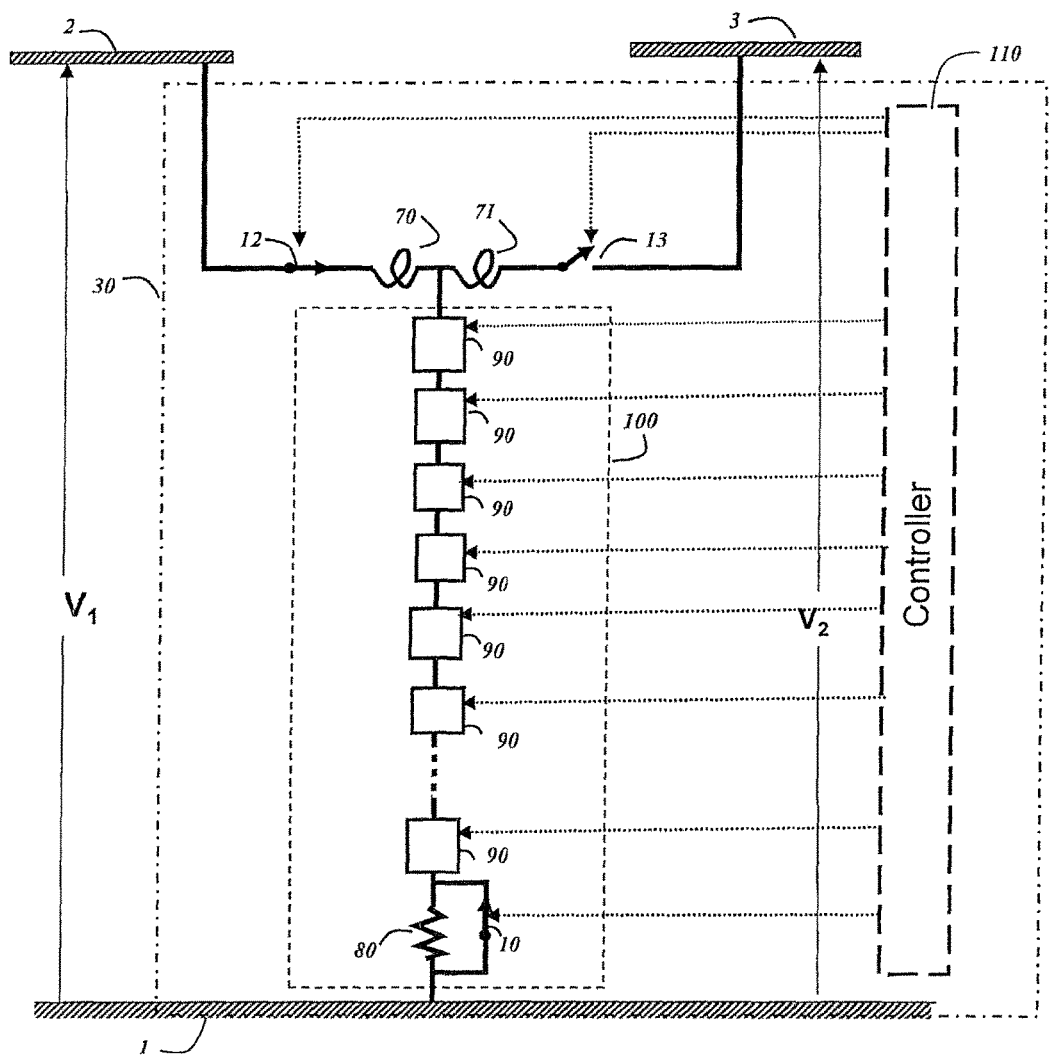
FIG. 5 shows the multi-modular dc-to-dc power transformation system embodiment of FIG. 4 configured to exchange charge from one dc node to a capacitor column.
Figure 6:
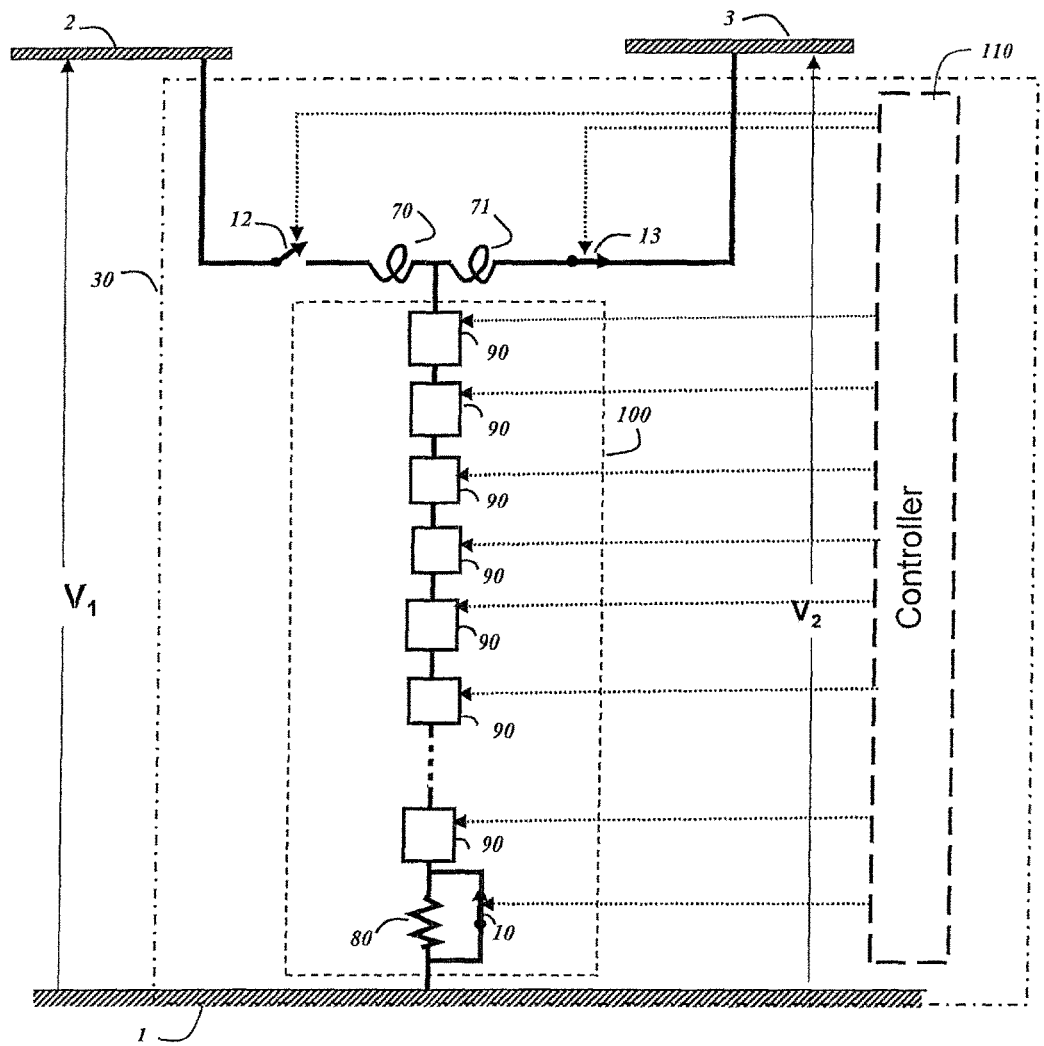
FIG. 6 shows the multi-modular dc-to-dc power transformation system of FIGS. 4 and 5 configured to exchange charge from another dc node to a capacitor column.

Switch 13 being now open, m (where m is less than n) capacitors 93 within the capacitive modules 90 comprising the column 100 are bypassed, thus leaving the capacitive column 100 with a reduced voltage of $(n-m)/n \times V_2$. Suppose, for example, that n and m are selected such that the ratio $(n-m)/n$ is exactly equal to $V_1/V_2$. In that case the voltage on either side of switch 12 will be the same and closing that switch 12 as illustrated in FIG. 5 will cause no charge transfer from the first dc voltage bus 2 to the capacitive column 100. Suppose however that the voltage on the first dc voltage node 2 is caused to be somewhat greater than $(n-m)/n \times V_2$. In that case closing of switch 12 in FIG. 5 will result in a resonant charge transfer from the first dc voltage node 2 to n-m of the capacitors 93 within the capacitive column 100 while, as noted above, m of those capacitors 93, still bypassed remain charged to $V_2/n$. If both the m bypassed capacitors 93 and the n-m unbypassed capacitors, in series, were then simply connected resonantly to the second bus 3 as shown in FIG. 6, the voltage of the capacitive column 100 would exceed $V_2$ and result in energy being transferred to bus 3. The result however would also leave n-m capacitors with higher post-discharge voltage than the m capacitors—a difference that would grow with each repeating cycle. Thus within this embodiment, during the resonant half cycle of charging time during which n-m capacitors 93 are receiving charge from the first dc node 2 as shown in FIG. 5, the actual number of the bypassed capacitors remains equal to m. However, the capacitor(s) that are bypassed should be rotated among capacitors 93, in one or multiple cycles in a sequence and for time durations that assures that all capacitors, m and n-m have equal charge and voltage variations. This is a commonly used charge equalization process called "sorting."

Step 2

This step consists only of closing switch 13 to resonantly discharge the total capacitive column 100, now with all bypasses removed, to the second dc bus 3 as is shown in FIG. 6.

A modification of this embodiment, which will also overcome the cumulative unbalance in capacitor voltages cited above and remedied above by sorting procedures, can be achieved by continually rotating the assignment of bypassed capacitors between charge and discharge cycles. Thus a capacitor which is bypassed in one cycle may not be bypassed in the next several cycles, and a capacitor not bypassed in that cycle may be bypassed in the next, the selection in each case being made so as to stabilize charge distribution among all capacitors over a large number of cycles.

It will be apparent from the above that in this embodiment the amount of power flowing from the primary node 2 to the secondary node 3 will depend on the degree to which the primary voltage rises above $V_2 \times (n-m)/n$ and, further, that if that voltage on the primary bus 2 falls below $V_2 \times (n-m)/n$, the sequence set forth above will result in power flow from second dc node 3 to the first dc node 2.

It is equally apparent that flow direction and level will respond in the same manner to changes in the voltage level of the secondary node 3. These changes in power flow are the consequence of external voltage adjustments rather than a power control signal. Thus flow through this dc transformation system embodiment will be governed by the ratio of terminal voltages in relationship to the ratio of n and m, just as, with an ac transformer, flow is dictated by the phase angle difference of the systems on its two terminals. If this embodiment is used to link to independent dc systems it will exchange power between those systems without closed loop internal power controls and in response to voltage adjustments on either system. Furthermore if the embodiment links two dc systems of identical voltage, variations in the selection of m, the number of bypassed capacitors 90, during the course of operation of those two systems can be used to control power flow in either direction between those two systems.

The number of capacitive modules 90 provided in the column 100 may exceed the number used in the process described above in order to be inserted to replace a capacitive module 90 which fails in operation and is permanently bypassed pending replacement.

Explanation of the foregoing embodiment was based on step-up operation of the embodiment discussed. It will be apparent to those versed in the art that the reverse sequence of operation will transfer power from a higher to a lower voltage bus, constituting step-down operation.

The voltage ratio of the DCT can be changed by changing the number of bypassed capacitors during Step 1 and adjusting the value of the associated reactor if it is necessary to keep the charge and discharge resonance frequency the same. Thus another embodiment of the invention, wherein the number m of bypassed capacitors is varied, can be used within a high voltage dc grid to regulate flow on one or more particular lines.

Figure 7:
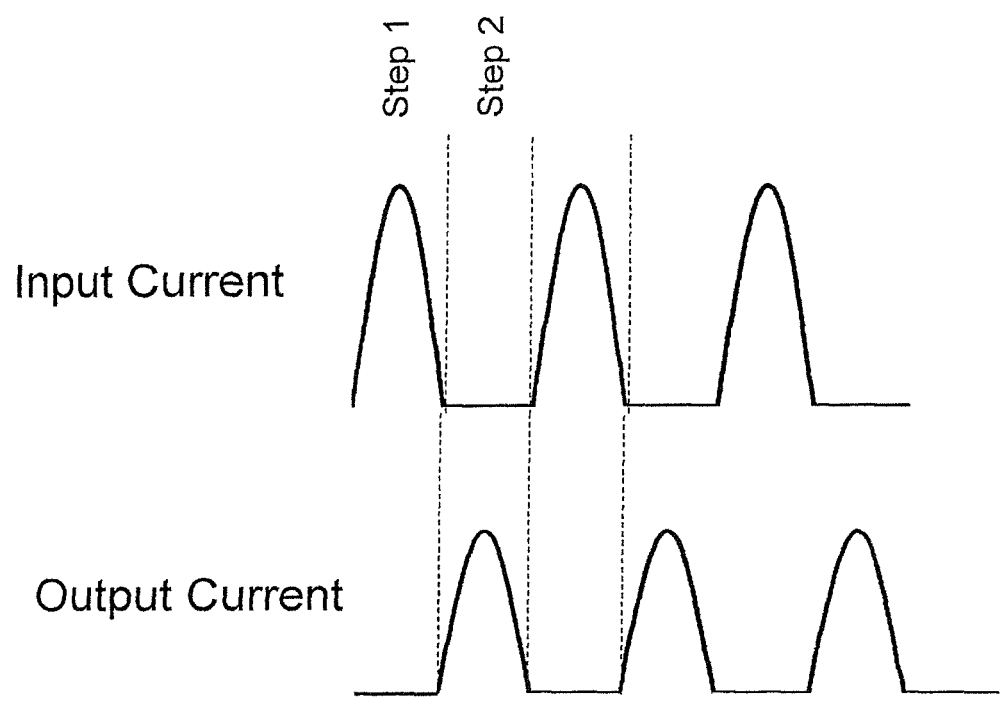
FIG. 7 shows the resonant nature of the lower voltage current pulse and the higher voltage current pulse in a multi-modular dc-to-dc power transformation system.
Figure 8:
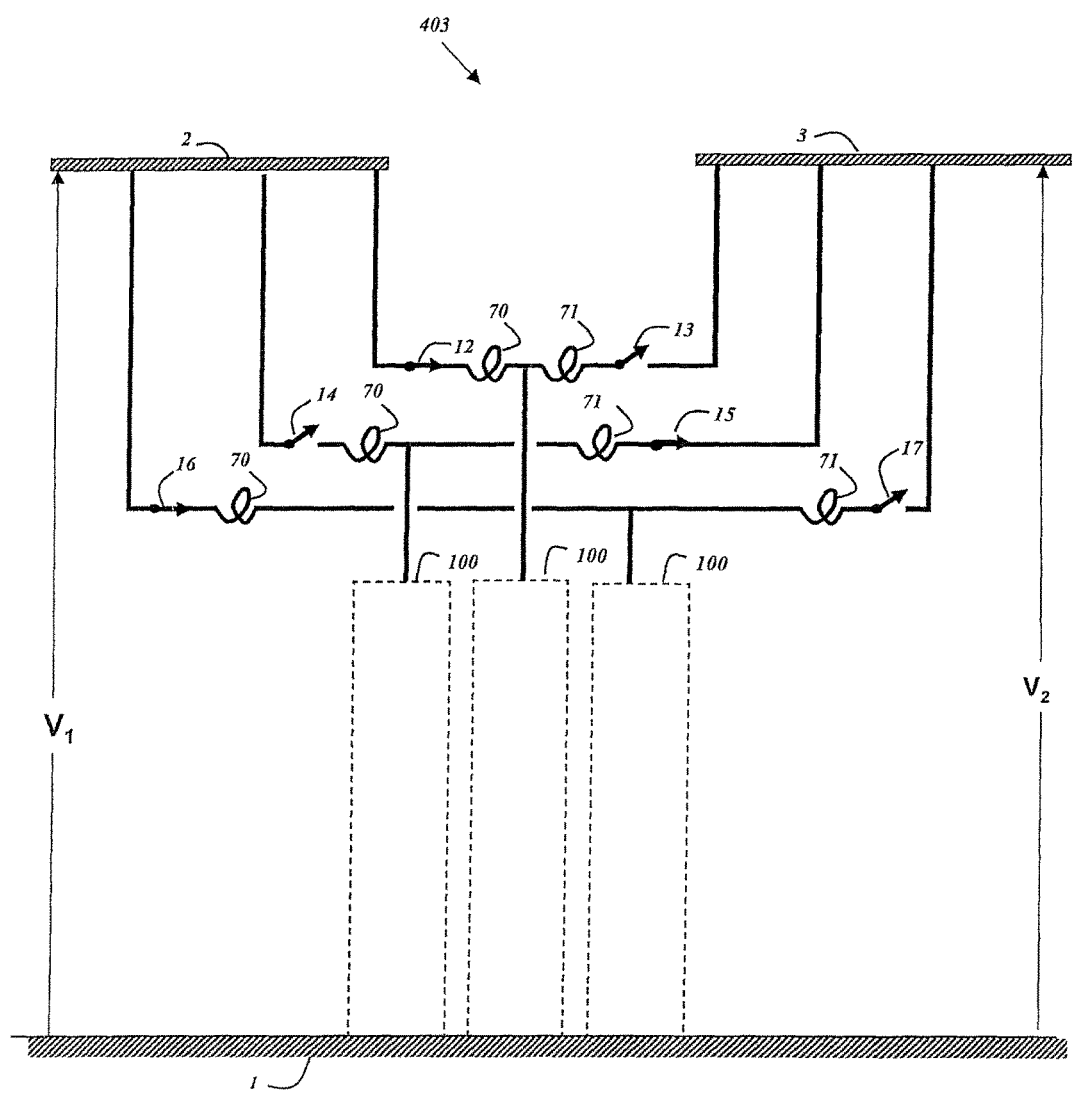
FIG. 8 shows an example in which a three-column multi-modular dc-to-dc transformation systems is used both to smooth input and output current levels and to increase the power capability of a compound dc-to-dc transformation system.
Figure 9:
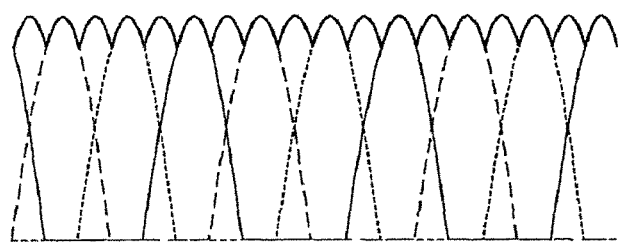
FIG. 9 shows the nature of input and output current wave-form resulting from an example compound dc-to-dc transformation system comprised of three individual dc-to-dc transformers using the selective bypass embodiment.

Resonant switching within the foregoing method and system will result in both input and output pulse wave forms of the nature shown in FIG. 7; a waveform that would be very difficult to convert to a useful, constant dc current. However a second (compound) embodiment of this invention consists of two or more DCTs in parallel (three in the example system 403 illustrated in FIG. 8) wherein each is caused to generate pulses equally spaced in time from each other; thus producing a series of additive current pulses as illustrated in FIG. 9 for the three DCT selective bypass embodiment. The resulting composite dc waveform has been shown by detailed transient simulation to be easily filtered to a smooth dc current. In addition to smoothing both output and input waveforms, the compound DCT embodiment increases the composite megawatt transfer capability of an individual DCT by a factor equal to the number of paralleled DCTs.

Figure 10:
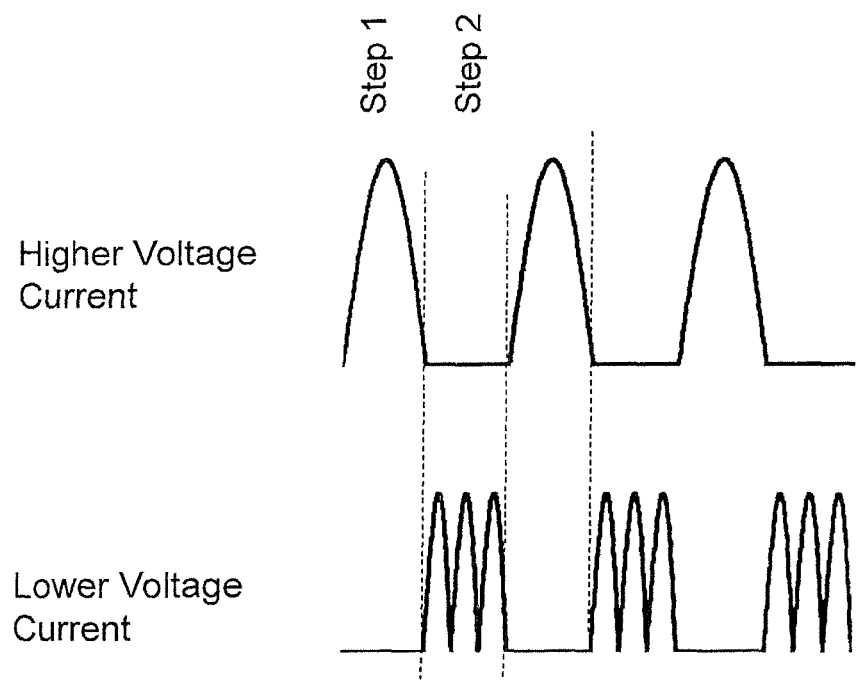
FIG. 10 shows the resonant nature of the lower voltage current pulse and the higher voltage current pulse in a sequential charge exchange dc-to-dc power transformer.
Figure 11:
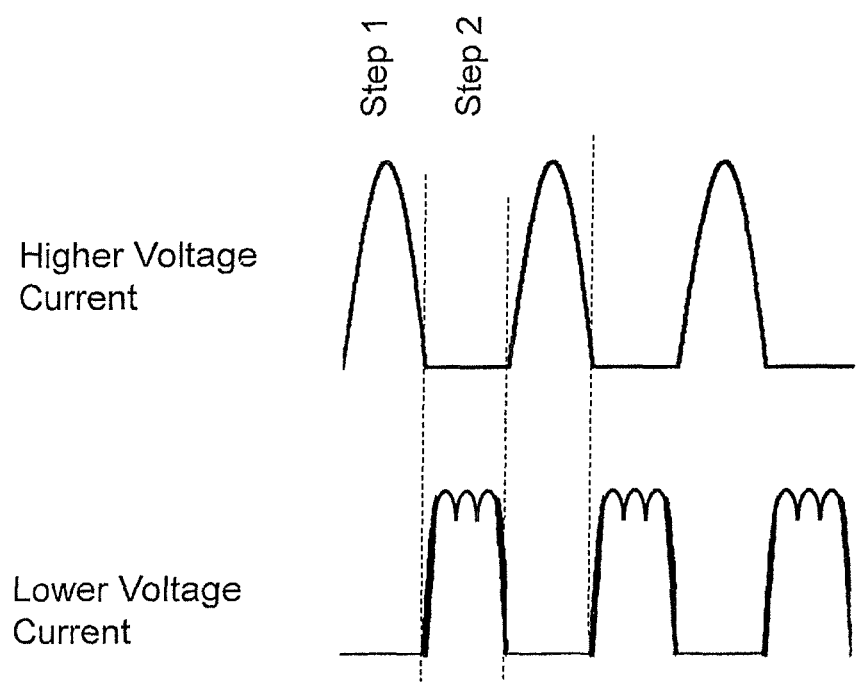
FIG. 11 shows the overlapping nature of the lower voltage current pulse and the resonance nature of the higher voltage current pulse in a sequential/selective charge exchange dc-to-dc power transformer.

An alternative sequential charge exchange embodiment will require the same start-up sequence cited above but, referring to FIG. 5, a differing operating sequence during step 1 as follows Step 1
- Switch 13 being now open and switch 12 closed, m (where m is less than n) capacitors 93 within the capacitive modules 90 comprising the column 100 are bypassed, where, as previously m must be selected such that (n−m)/n capacitors 93 equal the voltage ratio $V_1/V_2$ in FIGS. 4, 5, and 6. Rather than a sorting action to equalize the charge change among all n capacitors during the charge exchange from a single group of n−m capacitors 93, the resonant exchange from an initial (n−m) group of capacitors 93 is achieved without any sorting interruption. Upon completion of that initial charge exchange, a second (n−m) group can be made to exchange energy with the lower voltage bus 2, and then, in sequence each (n−m) group until all have been allowed to undertake a charge exchange with the lower voltage dc bus 2. The result will be a series of individual charge exchanges with the lower voltage bus 2, rather than a single, composite exchange. Thus the resulting current profile, for an example ratio of (n−m)/n of 1/3, will be of the form shown in FIG. 10 unless the reactance is increased to cause the sequential pulses to overlap in time as shown in FIG. 11.
- It will be apparent that for this embodiment the ratio n/(n−m) must be an integer and, further, that in the limit, no more than n/(n−m) capacitive modules 90 are required. It will also be apparent that if a relatively large number of capacitive modules 90 are in place, changes in voltage ratio can be made by inactivating and bypassing certain of those modules 90 to reduce the effective number n to n', thereby creating new groupings such that the ratio n'/(n'−m') is also an integer and a voltage ratio different than the first.
- In the above cases the current pulse magnitude may vary slightly from one (n−m) group's charge exchange to the next due to fluctuations in the voltage on the lower voltage bus 2. Build-up of such inequalities can be minimized by changing the sequence of (n−m) groups' connection to the lower voltage node 2 from one cycle to the next.

It will be apparent that for all embodiments cited above, the amount of power flowing from the primary node 2 to the secondary node 3 will depend on the degree to which the primary voltage rises above $V_2 \times (n-m)/n$ and, further, that if that voltage on the primary bus 2 falls below $V_2 \times (n-m)/n$, the sequence set forth above will result in power flow from second higher voltage node 3 to the first lower voltage node 2.

It is equally apparent that flow direction and level will respond in the same manner to changes in the voltage level of the secondary node 3. These changes in power flow are the consequence of external voltage adjustments rather than a power control signal. Thus flow through this dc transformation system embodiment will be governed by the ratio of terminal voltages in relationship to the ratio of n and m, just as, with an ac transformer, flow is dictated by the phase angle difference of the systems on its two terminals. If this embodiment is used to link two independent dc systems it will exchange power between those systems without internal power controls and in response to voltage adjustments on either system. Furthermore if the embodiment links two dc systems of identical voltage, variations in the selection of m, the number of bypassed capacitors 90, during the course of operation of those two systems can be used to control power flow in either direction between those two systems.

In either of the above embodiments the number of capacitive modules 90 provided in the column 100 may exceed the number used in the embodiments described above in order to be inserted to replace a capacitive module 90 which fails in operation and is permanently bypassed pending replacement.

It is apparent that the simplest operation of either embodiment will result where (n−m)=1, i.e. where the voltage ratio $V_1/V_2 = 1/n$ and one capacitor at a time sees charge exchange with the lower voltage bus 2.

Explanation of the foregoing embodiment was based on step-up operation of the embodiment discussed. It will be apparent to those versed in the art that the reverse sequence of operation will transfer power from a higher to a lower voltage bus, constituting step-down operation.

The voltage ratio of the DCT can be changed by changing the number of bypassed capacitors during Step 1 and adjusting the value of the associated reactor if it is necessary to keep the charge and discharge resonance frequency the same. Thus another embodiment of the invention, wherein the number m of bypassed capacitors is varied, can be used within a high voltage dc grid to regulate flow on one or more particular lines.

Any device used within a high voltage dc system must be capable of sustaining accidental short circuits within the connected dc system(s) and, conversely, must not, as a result of short circuits within itself or through its connection to another system, increase the risk or consequences of a short circuit to the connected system(s).

The DCT embodiments cited herein meet those criteria. A fault on either node 2 or node 3 in FIG. 8 will not be conveyed to the other node since at no time is there a galvanic path from one node to the other. When one of each switch pairs 12 and 13, 14 and 15, or 16 and 17 in FIG. 8 are closed, the other is open.

It will be apparent to those versed in the art that in the event of a fault to ground within individual modules such as 90 in FIG. 2, state of the art methods can be employed within half-bridge modules such as that illustrated in FIG. 1 as component 94 to protect remaining modules.

One or more inductors may be included in the capacitor column comprised of individual modules 90 to protect direct capacitor discharge in the event of an internal fault. The total inductance so included in the capacitor column is determined with respect to the values of inductors 70 and 71 to maintain the designed frequency of resonance.

Figure 12:
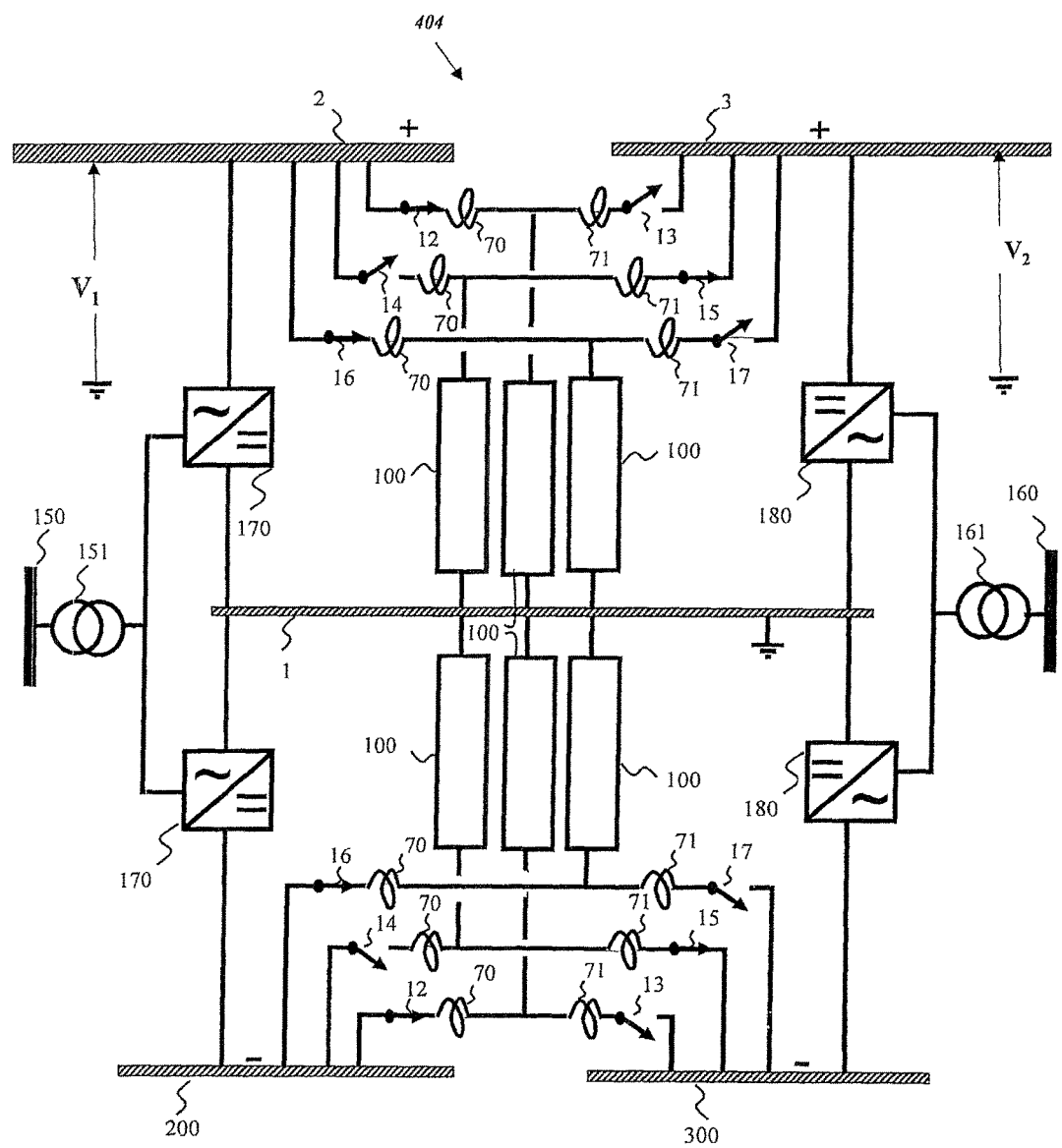
FIG. 12 shows application of a multi-modular dc-to-dc transformation system to interconnect two grounded bipole dc systems.

The foregoing embodiments have been explained based on dc-to-dc transformation between nodes 2 and 3 within the simple example dc configurations used in FIGS. 4, 5 and 6 in which each node represents a voltage with respect to ground. Extension of the explanation addressing those figures to dual positive and negative nodes comprising a typical grounded bipole system 404 is illustrated in FIG. 12 which shows the embodiment of FIG. 8 applied to both positive and negative poles within a system context. In FIG. 12 positive nodes 2 and 3 are matched by mirror-image negative nodes 200 and 300, one pair of positive and negative nodes being electrically coupled to an alternating current bus 150 through an ac transformer 151 to positive and negative ac-to-dc bridges 170 and the other coupled to a different ac node 160 through an ac transformer 161 through ac-to-dc bridges 180.

Figure 13:
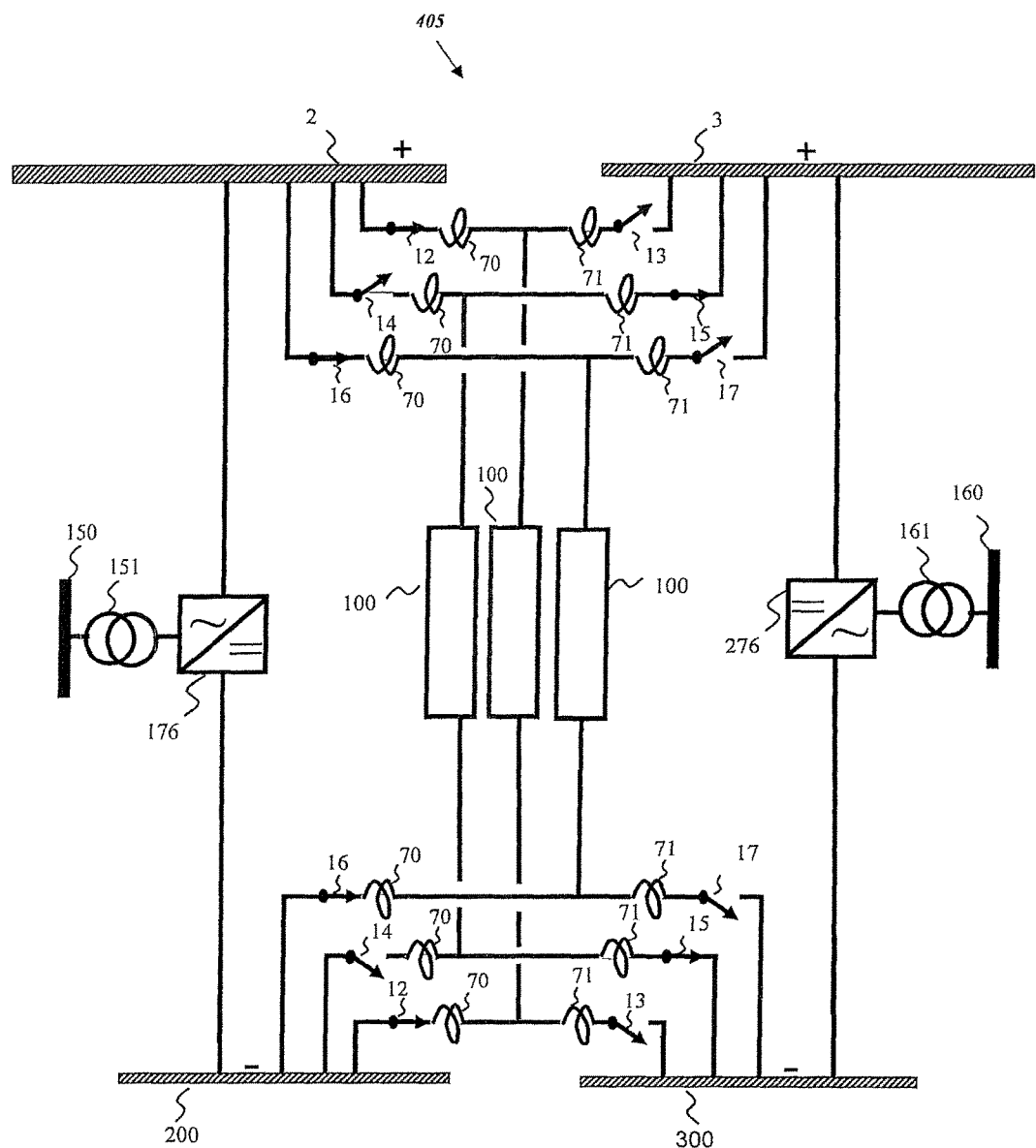
FIG. 13 shows application of a multi-modular dc-to-dc transformation system to interconnect two symmetrical monopole dc systems.

Some high-voltage dc transmission systems achieve economies by omitting a ground return path and simply apply dc voltage directly between two poles as shown in system 405, FIG. 13 which shows a symmetrical monopole. In FIG. 13 distant ac busses 150 and 160 are stepped up to a high ac voltage by transformers 151 and 161 respectively, that higher ac voltage then being converted to dc by prior art ac/dc converters 176 and 276. In system 405, capacitive columns 100 exchange charge between a primary node pair 3, 300 and a secondary node pair 2, 200 rather than from individual poles to ground or a common neutral conducting path.

Figure 14:
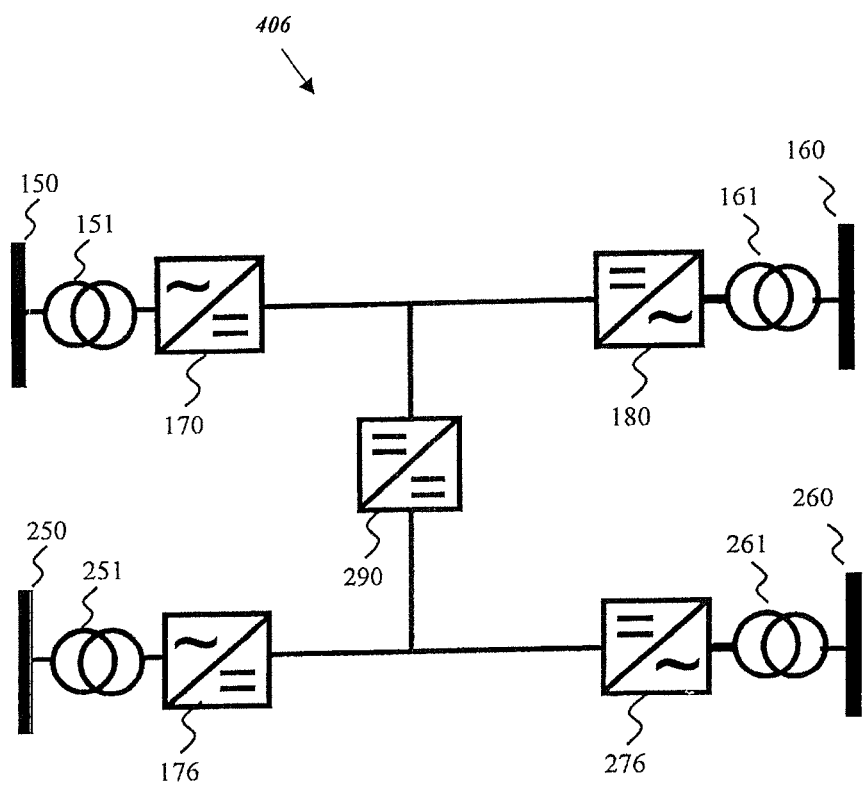
FIG. 14 shows a dc-to-dc transformer interconnecting two independent dc transmission systems

Suppose either the representation of FIG. 12 for a grounded bipole configuration or FIG. 13 for a symmetrical monopole system is extended to a practical system as shown in simplified format by system 406 in FIG. 14 which shows two dc transmission interconnections; one between ac sources 150 and 160 and the other between ac sources 250 and 260. Both interconnections in FIG. 14 first use step-up transformers 151, 251, 161 and 261 to obtain a high ac voltage as input to state of the art ac/dc converter terminals 170, 180, 176 and 276. The two transmission lines are connected by a DCT 290 which may represent prior art or an embodiment of the invention described herein. The operation of that DCT 290 is amply illustrated by FIG. 12 if both systems are of a grounded bipole configuration or by FIG. 13 if both are of a symmetrical monopole systems. However there are two compatibility issues that need to be addressed.

The first is compatibility of the commutation system used to convert ac to dc and vice versa within in the upper system shown in FIG. 14 (170, 180) with the commutation system used in the lower system (176, 276). Until relatively recently ac-to-dc converters were based on line-commutated technology, a technology that accommodates current flow in only one direction. Thus with that technology the direction of power flow can be reversed only by reversing voltage on both poles. More recent ac-to-dc converter bridges use voltage source conversion technology which allows current to reverse direction; thus allowing reversals of power flow while keeping voltage polarity unchanged. It will therefore be apparent to those versed in the art that in order that a capacitive column DCT of design either based on prior art or embodiments cited herein be capable of transforming energy from a first dc source based on line-commutated technology to a second based on voltage source technology, the submodules within the DCT must be full bridges as cited in FIG. 3 rather than half-bridges as illustrated in FIGS. 1 and 2. If the polarity of node 3 in FIG. 4 were to be reversed as a consequence of a change in power flow direction within the system of which it is a part, that polarity could be restored to a polarity appropriate to node 2 prior to its charge exchange with that node. Thus exchange with node 2 would not change as polarity of node 3 reversed.

Figure 15:
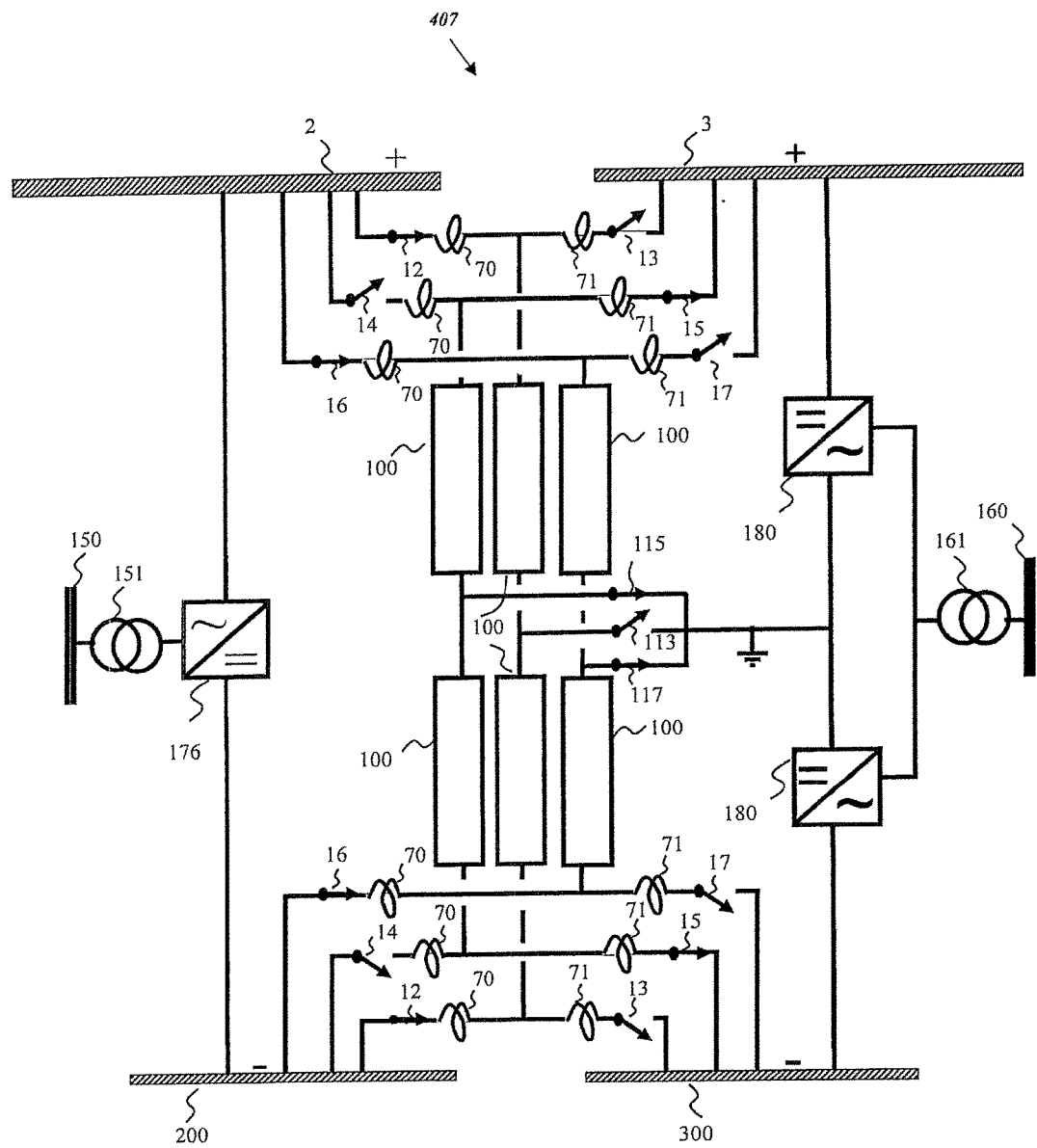
FIG. 15 shows application of a multi-modular dc-to-dc transformation system to interconnect a grounded bipole dc system and a symmetrical monopole transmission system.

A second, more challenging compatibility requirement is the potential difference in grounding practice between two systems connected by a DCT, specifically between a grounded bipole system and a symmetrical monopole system. FIG. 15 shows system 407, which is an embodiment of this invention that achieves that objective for any DCT based on charge exchange between two dc nodes by means of an intermediate capacitive column, such as other embodiments cited herein. The embodiment of system 407 preserves the advantages unique to both systems; in the grounded bipole case, the ability to transmit 50% power with one pole out of service, in the symmetrical monopole system the ability to sustain temporary line-to-ground faults without power interruption.

System 407 includes grounding switches 113, 115, and 117 which allow the center point of the connections between pairs of upper and lower columns 100 to be grounded when any one column 100 is exchanging charge with the grounded bipole nodes 3, 300 and to be ungrounded leaving two columns 100 in series during charge exchange with the symmetrical monopole nodes 2, 200. Preservation of the operating advantages of each system as cited above, can best be seen by example. Suppose that the positive node 3 of the grounded bipole system were subject to a node-to-ground fault. In that case the upper capacitor columns 100 would be isolated by the opening of line switches associated with that node (switches 13,15,17) while the controller 110 illustrated in FIGS. 4, 5 and 6 but implicit in all subsequent DCT figures would cause all submodules within the three positive columns to be bypassed. The three capacitive modules 100 associated with the negative node 300 would remain in service allowing 50% power transfer but, absent any other action, leaving just 50% of the prior voltage on which charge exchange with the symmetrical monopole nodes 2, 200. That disparity is overcome in this embodiment by changing the number of capacitive modules within the negative capacitive columns 100 such that the resulting voltage on which charge exchange is based remains the same. If, during normal operation n is the number of submodules and m the number bypassed, then with one bipole node 3, 300 out of service, the voltage per module would remain the same but the number of modules in service would be cut in half, i.e. n'=n/2. If the resulting voltage for charge exchange with the symmetrical monopole nodes 2, 200 is to remain the same, then the following equation must apply:

$$n-m=n/2-m' \text{ or } m'=m-n/2 \quad \text{(equation 1)}$$

where m' is the number of submodules bypassed during connection to the symmetrical monopole bus with one polarity of the grounded bipole system out of service. Since the effective capacitance of the un-bypassed submodules remains the same in either case, the pulse frequency seen by the symmetrical bipole nodes 2, 200 will remain unchanged with one bipole node removed from service.

During a temporary pole-to-earth fault on either of the symmetrical monopole nodes 2, 200, the pole to pole voltage will remain the same, thus having no effect on the charging or discharging process when any of capacitive columns 100 are connected to that side. Moreover, the line switches in each DCT operate in a complementary manner, i.e. when one is closed the other will always be open. Thus there is always galvanic isolation between the two HVDC lines. Thus the MMDCT does not interrupt power transfer during a temporary pole-to-earth fault on the symmetrical monopole side.

While the example embodiments illustrated in FIGS. 1 through 15 were, for ease of explanation, limited to power transfer between just two nodes, the principles inherent in the embodiments cited above can be extended to embodiments in which power is simultaneously exchanged among any number of nodes just as magnetic transformation within an AC transformer may do so with multiple windings.

As previous paragraphs have shown, a capacitor column 100 within a two-node MMDCT as shown in FIG. 4 for example, if connected first to one node and then the other, will result in current wave-forms as shown in FIG. 7 which, for both nodes, will have a zero current interval between current pulses while the capacitive column 100 is connected to the alternate node 2 or 3 in FIG. 4. In an MMDCT where the number of columns is equal to the number of nodes, there will be no current zero period between current pulses entering or leaving any node inasmuch as each node can be connected to so as to exchange charge with one column or other during each step.

Figure 16:
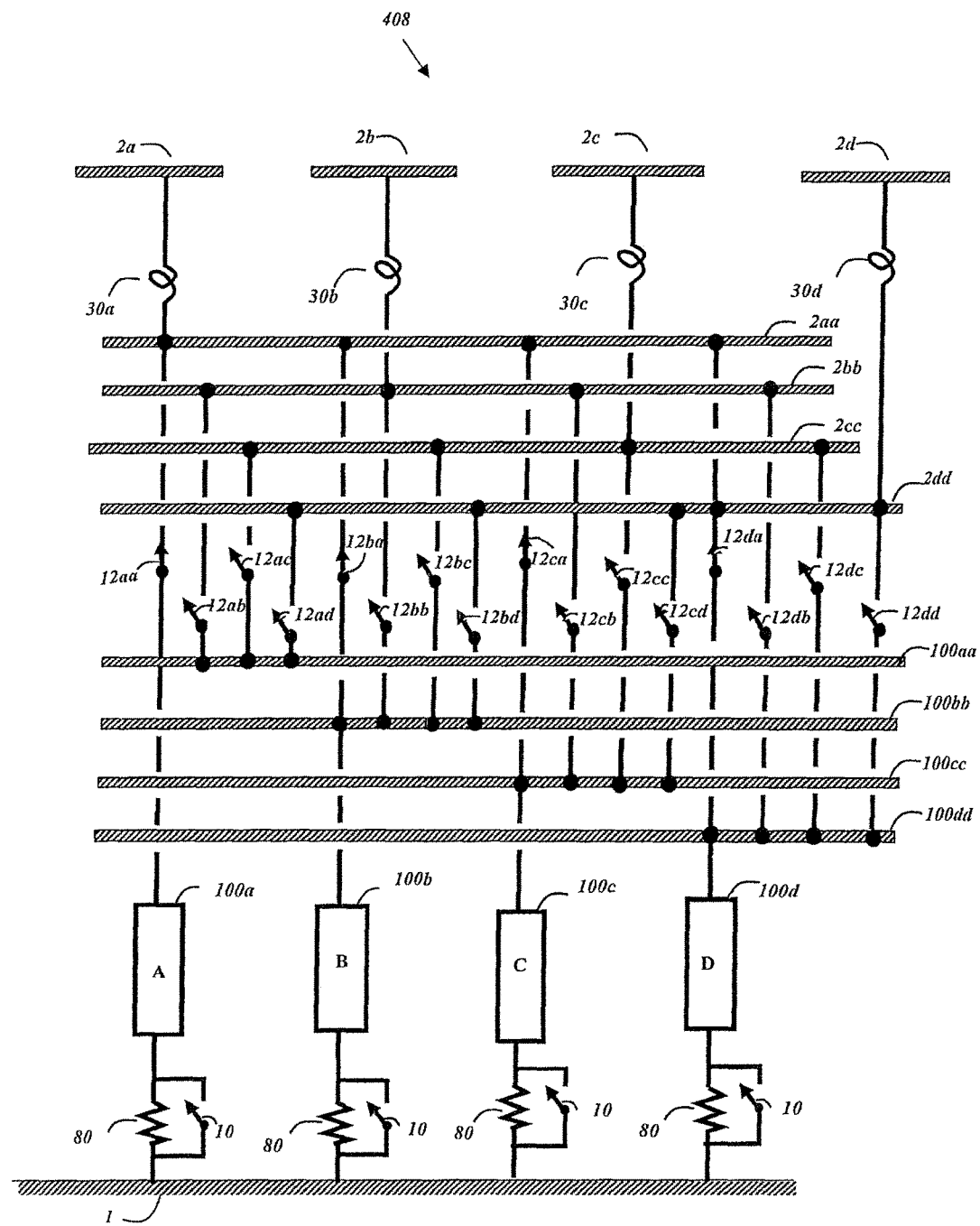
FIG. 16 shows an example four node dc-to-dc transformer embodiment.

FIG. 16 shows an example MMDCT 408 capable of transferring power among four separate nodes, 2*a*, 2*b*, 2*c*, and 2*d* using four capacitive columns 100*a*, 100*b*, 100*c*, and 100*d*, and a series of switches labeled 12*aa* through 12*dd*. FIG. 17 illustrates an example switching sequence that will achieve that inter-node power transfer, in which the capacitive columns and the nodes are referred to generically using the letters A, B, C and D rather than the part numbers used in FIG. 16. Note that during the connection schedule shown in FIG. 17 any particular capacitive column, 100*a*, 100*b*, 100*c*, or 100*d* may serve as a means to achieve energy transformation between any two nodes 2*a*, 2*b*, 2*c*, 2*d*, during the sequence of steps constituting one cycle. During a given cycle, each capacitive column will, prior to connection to a particular node, be caused to bypass sufficient of its capacitor modules to adjust the resulting column voltage to a level appropriate to that node in a manner described in previous paragraphs. Any such sequence must assure that the net energy transfer into and out of the multi-node DCT must, as within an AC transformer, be zero. Over one cycle, the current profile seen by any given node will consist of four time-contiguous pulses in steady state.

For diagrammatic convenience FIG. 16 extends nodes 2*a*, 2*b*, 2*c* and 2*d* to corresponding horizontal nodes 2*aa*, 2*bb*, 2*cc*, and 2*dd*, all internal to multi-node MMDCT 408 and likewise extends the terminals of capacitive columns 100*a*, 100*b*, 100*c*, and 100*d* to corresponding nodes 100*aa*, 100*bb*, 100*cc*, and 100*dd*, also internal to multi-node MMDCT 408.

FIG. 17 shows, as an example, the switch positions in FIG. 16 corresponding to the initial step in the use of MMDCT 408 in which capacitor columns 100*a*, 100*b*, 100*c*, and 100*d* are connected for resonant charge exchange with their corresponding nodes 2*a*, 2*b*, 2*c*, and 2*d*. Extension of the embodiment of FIG. 16, a four-node MMDCT to corresponding MMDCTs with other numbers of nodes and corresponding switching matrix will be apparent to those versed in the art.

In the example of FIGS. 16 and 17, it will be apparent that each of the nodes 2*a*, 2*b*, 2*c*, and 2*d* will see a series of half-sine wave charge exchange pulses which will have a resonant period determined by the reactors 30*a*, 30*b*, 30*c* and 30*d* and the capacitance of the column to which it is connected. While those periods need not be identical, the efficiency of the multi-terminal MMDCT will be highest when they are.

A number of implementations have been described. Nevertheless, it will be understood that additional modifications may be made without departing from the scope of the inventive concepts described herein, and, accordingly, other embodiments are within the scope of the following claims.

What is claimed is:

1. A dc-to-dc power transformation system that is constructed and arranged to transform power from a first dc voltage node to a separate second dc voltage node, comprising:
    at least one column, each column comprising a plurality of capacitive modules connected in series, each capacitive module comprising a series connected capacitance, where each module is constructed and arranged so as to be capable of electrically inserting its capacitance into the column, or electrically isolating and electrically bypassing its capacitance from the column, wherein a first end of the column is electrically connected to ground;
    first and second reactors;
    first and second switches, wherein the first switch is in series with the first reactor between a second end of the column and the first node, and the second switch is in series with the second reactor between the second end of the column and the second node; and
    a controller that is adapted to control:
        the insertion of the capacitances into the column;
        the isolation and bypassing of the capacitances from the column; and
        the states of the first and second switches;
    wherein through such control the controller:
        repeatedly, sequentially connects the second end of the column to only one of the first and second dc voltage nodes at a time; and
        controls the number of capacitances that are isolated and bypassed from the column before its connection to either dc voltage node during such repeated, sequential connection.

2. The system of claim 1 wherein the controller is adapted to control the states of the first and second switches so as to connect the column to the first dc voltage node so as to initiate a resonant energy exchange between the column and the first dc voltage node, and then disconnect the column from the first dc voltage node at a current zero point following a half-cycle of resonant and sinusoidally varying current, to exchange energy between multiple capacitances of the column and the first dc voltage node.

3. The system of claim 1 wherein the controller is adapted to electrically bypass selected capacitances of the column between exchange of charge with the first dc voltage node and exchange of charge with the second dc voltage node, so as to establish a ratio of input and output voltage.

4. The system of claim 1 wherein one node is at a higher voltage than the other node, and wherein the controller is adapted to cause a plurality of series-connected capacitances to exchange charge with the higher voltage node, then, in subsequent connection to the lower voltage node, by electrically bypassing capacitances, serially, separately and sequentially equally distribute the change in charge among the capacitances such that a plurality of capacitances have equal charges.

5. The system of claim 1 wherein one node is at a lower voltage than the other node, wherein a charge exchange cycle comprises the sequential connection of the second end of the column to the first node then the second node, and wherein the controller is adapted to selectively reassign by-pass states among multiple capacitances from one charge exchange cycle to the next during a connection to and charge exchange with the lower voltage dc voltage node, so as to equalize, over a period of multiple charge exchange cycles, charges on multiple capacitances.

6. The system of claim 1 further comprising a ground switch that is controlled by the controller so as to provide for transformation between grounded and ungrounded dc systems.

7. The system of claim 1 wherein each module comprises a full bridge, such that the capacitances are able to reverse polarity connection in the column.

8. The system of claim 7 wherein the controller is adapted to reverse the polarity connection of each module between exchange of charge with the first dc voltage node and exchange of charge with the second dc voltage node.

9. The system of claim 1 comprising a plurality of columns, wherein the system is constructed and arranged to transform power among two or more dc voltage nodes, and wherein the controller is adapted to cause each of a number of columns, that number being equal to the number of nodes, to sequentially exchange energy with each node.

10. The system of claim 1 comprising a plurality of columns connected in parallel between ground and the first and second dc voltage nodes, and further comprising separate switches in series with a reactor between the second end of each column and each of the two nodes, and wherein the controller is adapted to control the states of all of the switches.

11. The system of claim 10 in which the controller is further adapted to establish additive input and output current pulses to or from multiple columns.

12. The system of claim 11 in which the controller is further adapted to cause the generation of pulses from each of the columns, where the pulses are equally spaced in time from each other.

13. The system of claim 10 wherein for each column the controller is adapted to control the states of the first and second switches so as to connect the column to the first dc voltage node so as to initiate a resonant energy exchange between the column and the first dc voltage node, and then disconnect the column from the first dc voltage node at a current zero point following a half-cycle of resonant and sinusoidally varying current, to exchange energy between multiple capacitances of the column and the first dc voltage node.

14. The system of claim 10 wherein for each column the controller is adapted to electrically bypass selected capacitances of the column between exchange of charge with the first dc voltage node and exchange of charge with the second dc voltage node, so as to establish a ratio of input and output voltage.

15. The system of claim 10 wherein one node is at a higher voltage than the other node, and wherein for each column the controller is adapted to cause a plurality of series-connected capacitances to exchange charge with the higher voltage node, then, in subsequent connection to the lower voltage node, by electrically bypassing capacitances, serially, separately and sequentially equally distribute the change in charge among the capacitances such that a plurality of capacitances have equal charges.

16. The system of claim 10 wherein one node is at a lower voltage than the other node, wherein for each column a charge exchange cycle comprises the sequential connection of the second end of the column to the first node then the second node, and wherein the controller is adapted to selectively reassign by-pass states among multiple capacitances from one charge exchange cycle to the next during a connection to and charge exchange with the lower voltage dc voltage node, so as to equalize, over a period of multiple charge exchange cycles, charges on multiple capacitances.

17. The system of claim 10 further comprising a ground switch associated with each column that is controlled by the controller so as to provide for transformation between grounded and ungrounded dc systems.

18. The system of claim 10 wherein each module of at least one column comprises a full bridge, such that the capacitances are able to reverse polarity connection in the column, and wherein the controller is adapted to reverse the polarity connection of each module between exchange of charge with the first dc voltage node and exchange of charge with the second dc voltage node.

19. A system for power transfer regulation from a first node at one dc voltage to a second node at nominally the same dc voltage, comprising a plurality of capacitances and a controller that is adapted to use the capacitances so as to resonantly exchange energy between the capacitances and the two nodes, wherein the controller is adapted to electrically bypass selected capacitances between exchange of charge with the first dc voltage node and exchange of charge with the second dc voltage node, so as to establish a ratio of input and output voltage.

20. The system of claim 19 wherein the controller is adapted to connect capacitances to the first dc voltage node so as to initiate a resonant energy exchange between the capacitances and the first dc voltage node, and then disconnect the capacitances from the first dc voltage node at a current zero point following a half-cycle of resonant and sinusoidally varying current, to exchange energy between the capacitances and the first dc voltage node.

21. The system of claim 19 wherein one node is at a lower voltage than the other node, wherein a charge exchange cycle comprises the sequential connection of the capacitances to the first node then the second node, and wherein the controller is adapted to selectively reassign by-pass states among multiple capacitances from one charge exchange cycle to the next during a connection to and charge exchange with the lower voltage dc voltage node, so as to equalize, over a period of multiple charge exchange cycles, charges on multiple capacitances.

22. The system of claim 19 further comprising a ground switch that is controlled by the controller so as to provide for transformation between grounded and ungrounded dc systems.

23. The system of claim 19 wherein the controller is adapted to reverse the polarity connection of each capacitance between exchange of charge with the first dc voltage node and exchange of charge with the second dc voltage node.

24. The system of claim 19 in which the controller is further adapted to establish input and output current pulses from multiple columns that are additive.

25. The system of claim 24 in which the controller is further adapted to cause the generation of pulses that are equally spaced in time from each other.

26. The system of claim 25 wherein the controller is adapted to electrically bypass selected capacitances of the column between exchange of charge with the first dc voltage node and exchange of charge with the second dc voltage node, so as to establish a ratio of input and output voltage.

27. The system of claim 25 wherein one node is at a lower voltage than the other node, wherein a charge exchange cycle comprises the sequential connection of the capacitances to the first node then the second node, and wherein the controller is adapted to selectively reassign by-pass states among multiple capacitances from one charge exchange cycle to the next during a connection to and charge exchange with the lower voltage dc voltage node, so as to equalize, over a period of multiple charge exchange cycles, charges on multiple capacitances.

28. The system of claim 25 wherein the controller is adapted to reverse the polarity connection of each capacitance between exchange of charge with the first dc voltage node and exchange of charge with the second de voltage node.

29. A method of transforming power from a first dc voltage node to one or more separate second dc voltage nodes using at least one column, each column comprising a plurality of capacitive modules connected in series, each capacitive module comprising a series connected capacitance, where each module is constructed and arranged so as to be capable of electrically inserting its capacitance into the column, or electrically isolating and electrically bypassing its capacitance from the column, wherein a first end of the column is electrically connected to ground or a node of opposite polarity and a second end of the column is selectively electrically coupled to the first and second nodes, the method comprising:
  repeatedly, sequentially connecting the second end of the column to only one of the first and a second dc voltage nodes at a time; and
  controlling the number of capacitances that are isolated and bypassed from the column before its connection to either dc voltage node during such repeated, sequential connection.

30. The method of claim 29 that uses a plurality of columns connected in parallel between ground and the first and second dc voltage nodes and separate switches in series with a reactor between the second end of each column and each of the two nodes, wherein the method further comprises controlling the states of all of the switches such that galvanic connection of the nodes is prevented.

* * * * *